Patented June 13, 1933

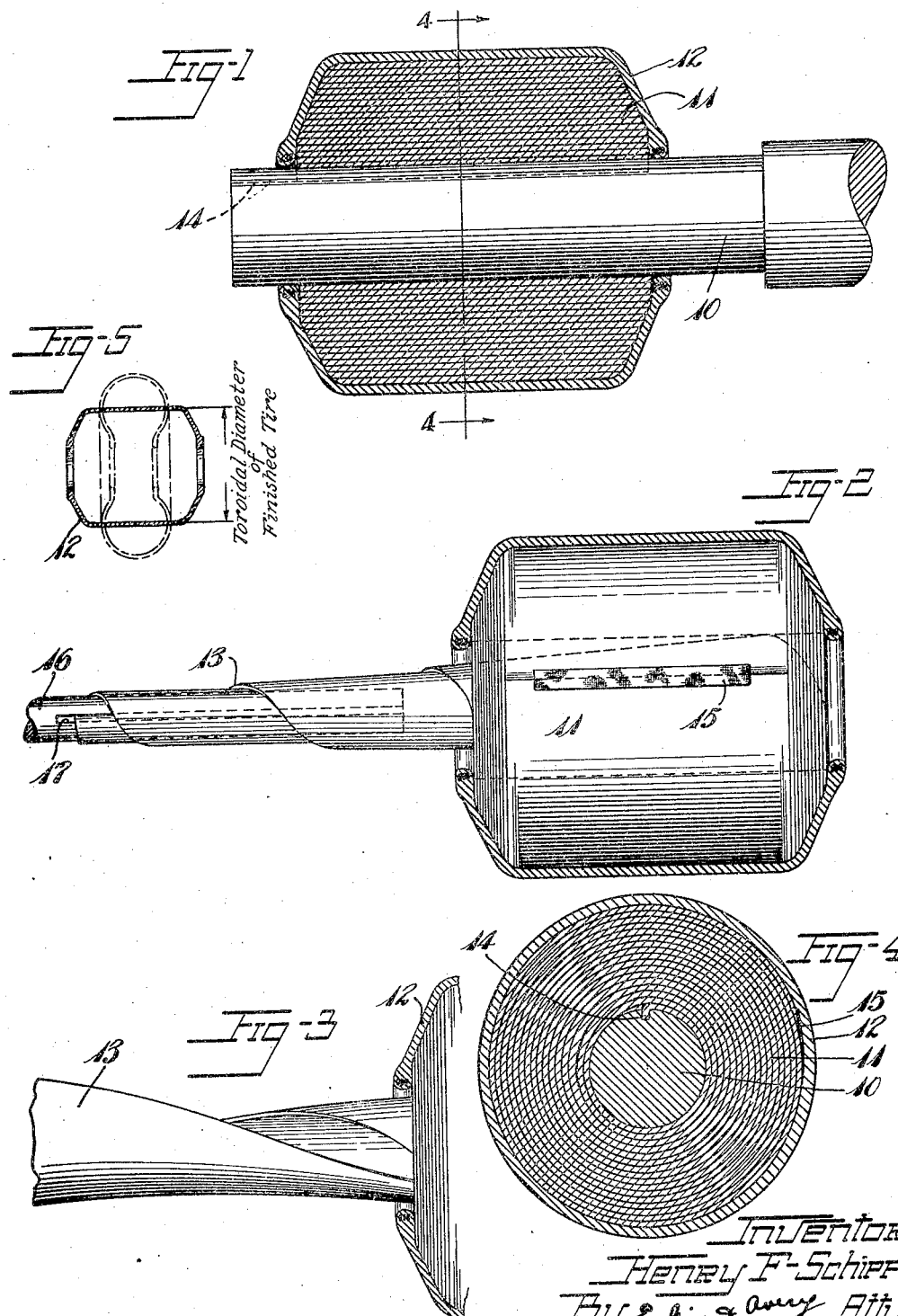

1,913,995

UNITED STATES PATENT OFFICE

HENRY F. SCHIPPEL, OF AKRON, OHIO, ASSIGNOR TO THE B. F. GOODRICH COMPANY, OF NEW YORK, N. Y., A CORPORATION OF NEW YORK

APPARATUS FOR MAKING TIRES

Application filed January 8, 1930. Serial No. 419,328.

This invention relates to tires and to apparatus for making the same, and more especially it relates to unvulcanized pneumatic tire casings and to the building forms on which they are fabricated.

The invention has its primary utility in the manufacture of tires which in their finished form have relatively small bead diameters as compared with tread diameters. Such tires when made by the "pulley-band" or "drum-built" method require excessive circumferential stretching to shape them to tire form, with the result that there is excessive angular distortion of the tire fabric at the tread portion of the tires and substantial separation of adjacent cords in the respective fabric plies. The initial building of such tires in final tire shape is impractical because of the difficulty of removing the building forms from the tires through their relatively small bead openings.

The chief objects of this invention are to provide an unvulcanized tire structure of the character mentioned which may be built upon an easily removable form or core; to provide such a structure which may be shaped to final form without harmful stretching and angular distortion of its fabric carcass plies; and to provide a building form which is easily removable from a tire having relatively small bead diameter. Other objects will be manifest.

Of the accompanying drawing:

Fig. 1 is a longitudinal section through my improved tire-building apparatus, and my improved tire built thereupon.

Fig. 2 is a side elevation of my tire-building form, and a tire in section thereupon showing the manner of initiating the removal of the form from the tire.

Fig. 3 is a fragmentary view similar to Fig. 2 showing the subsequent position of the form during its removal from the tire.

Fig. 4 is a section on line 4—4 of Fig. 1.

Fig. 5 is a section through an unfinished tire built according to my invention, the shape of the tire in finished form being indicated therein.

Referring to the drawing, 10 is the rotatable spindle of a tire-building machine (not shown) of preferred or known construction, 11 is a tire-building form or core mounted upon said spindle, and 12 is a tire casing built upon the form 11. The form 11 comprises a single continuous strip or band 13 of flexible material, such as rubberized fabric or belting, arranged in a plurality of superposed spiral convolutions. The leading end of the strip 13 is directed radially inward and mounted in a radial slot 14 formed in the spindle 10 and extending longitudinally from one end thereof, and the trailing end of the strip is disposed on the outer face of the wrapped structure and adhered thereto in any suitable manner as by an adhesive strip or tape 15, Fig. 2. The direction of the wraps of the strip 13 upon the spindle 10 is such that the wraps are not loosened by the rotation of the spindle during the building of a tire on the form.

In shape the form 11 is cylindrical in its middle region, and its ends or lateral portions are frusto-conical. This effect is attained by using a form-strip 13 which is substantially uniformly tapered from one end to the other, the wide end of the strip being on the inside of the coiled form.

The proportions of the respective surfaces of the form 11 are governed by the tire to be built thereon. Considering the shape of a finished tire as tore or torus, those portions of the tire 12 built upon the frusto-conical end portions of the form 11 constitute those portions of the finished tire which are inside its toroidal diameter, and the portion of the tire 12 built upon the cylindrical middle portion of the form constitutes the portion outside the toroidal diameter of the finished tire as shown in Fig. 5. Thus in the subsequent shaping of the tire casing 12 to finished tore form, as indicated by the broken lines in Fig. 5, only the medial, cylindrical portion of the tire casing requires to be distended or stretched, and such stretching is relatively small as compared to the amount of stretch required to form the usual flat drum-built tire to tore shape, with the result that there is less angular distortion of the carcass cords in applicant's structure.

In the operation of applicant's apparatus, the form-strip 13 being mounted upon the spindle 10 in convoluted condition as a tire-building form 11, with its inner end mounted in the slot 14 in said spindle, the latter is caused to rotate and the tire 12 is built upon said form in the usual or preferred manner. Then the form 11 with the tire 12 thereon is removed from the spindle 10 by sliding the form axially of the spindle, and a rotatable tool 16, of relatively small diameter as compared with the spindle 10, and formed with a recess or closed-end slot 17 in its end portion, is inserted into the axial aperture in the form 11 and manipulated to engage the end of the strip 13 in its slot 17. The tool 16 is then rotated to wrap the strip 13 about it and is then withdrawn from the form, thus drawing the large end of the strip 13 with it, as is clearly shown in Fig. 2. Once the end of the strip 13 is withdrawn from the form, the tool 16 may be disengaged therefrom and the strip twisted and pulled from the tire 12 in the form of a helix, the convolutions of which are spaced apart (as shown in Fig. 3), so as to permit them to pass through the opening at the bead portion of the tire. The strip 13 may be rewound by mounting its leading end in the slot 14 of the spindle 10 and then rotating the latter while guiding the strip 13 accurately thereonto. The operation as described may then be repeated.

Modifications may be resorted to without departing from the scope of my invention as I do not limit my claims wholly to the exact construction of product or apparatus shown and described.

I claim:

1. A tire-building form of generally cylindrical shape having tapered end portions, said form comprising a plurality of superposed convolutions of a single continuous strip of material.

2. A tire-building form comprising a continuous strip of flexible material arranged in a plurality of superposed convolutions which are disposed longitudinally of a tire built thereupon.

3. A tire-building form comprising a continuous strip of flexible material arranged in a plurality of superposed convolutions, said strip being substantially uniformly tapered in width from one end to the other.

4. A tire-building form comprising a continuous strip of flexible material arranged in a plurality of superposed convolutions, and means for securing the end of the outer convolution to the underlying structure.

5. A tire-building form comprising a continuous strip of flexible material arranged in a plurality of superposed convolutions, the end portion of the innermost convolution being directed radially inward.

6. Tire-building apparatus comprising a rotatable spindle, a tire-building form mounted coaxially thereon and comprising a plurality of superposed convolutions of a continuous strip of flexible material, and means for preventing relative angular movement of the spindle and form.

7. Tire-building apparatus comprising a rotatable spindle formed with a longitudinal slot, and a tire-building form comprising superposed convolutions of a strip of flexible material mounted thereon, the inner end of said strip being mounted in said slot.

8. Tire-building apparatus comprising a generally cylindrical tire-building form having end portions of such a radial depth as to permit the building of a tire thereupon such that the toroidal diameter of the tire after it is distended to tore shape is substantially the same as the diameter of the cylindrical portion of the form.

9. Tire-building apparatus comprising a generally cylindrical tire-building form having tapered end portions of such a radial depth as to permit the building of a tire thereupon such that the toroidal diameter of the tire after it is distended to tore shape is substantially the same as the diameter of the cylindrical portion of the form.

In witness whereof I have hereunto set my hand this 4th day of January, 1930.

HENRY F. SCHIPPEL.